United States Patent [19]

Treuner

[11] 3,755,306

[45] Aug. 28, 1973

[54] 3-ARYLSULFONY L-1,2,4-OXADIAZOLES

[75] Inventor: Uwe D. Treuner, Regensburg, Germany

[73] Assignee: E. R. Squibb & Sons, Inc., Princeton, N. J.

[22] Filed: Sept. 5, 1972

[21] Appl. No.: 285,968

Related U.S. Application Data

[63] Continuation-in-part of Ser. No. 190,692, Oct. 19, 1972, abandoned.

[52] U.S. Cl. ........... 260/239.9, 260/307 G, 424/272
[51] Int. Cl. ..................... A61k 27/00, C07d 85/52
[58] Field of Search ..................... 260/239.9, 307 G

[56] References Cited
OTHER PUBLICATIONS

Behr – "Oxadiazoles & Related Compounds" – pp. 245–249 in Vol. 17 of Heterocyclic Compounds – Wiley Press (1962).

Primary Examiner—Henry R. Jiles
Assistant Examiner—Cecilia M. S. Jaisle
Attorney—Lawrence S. Levinson

[57] ABSTRACT

3-Arylsulfonyl-1,2,4-oxadiazoles of the following general formual

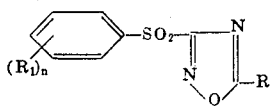

are useful as antimicrobial agents, hypoglycemic agents and antiinflammatory agents.

11 Claims, No Drawings

3-ARYLSULFONY L-1,2,4-OXADIAZOLES

This application is a continuation-in-part of U.S. application Ser. No. 190,692, filed Oct. 19, 1971 now abandoned.

BRIEF SUMMARY OF THE INVENTION

This invention relates to new 3-arylsulfonyl-1,2,4-oxadiazoles having the following formula (I) 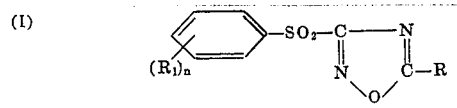

wherein
- R is hydrogen, trichloromethyl, amino, lower alkylamino, guanidino, hydroxy, lower alkoxy or lower alkylthio;
- $R_1$ is hydrogen, lower alkyl, amino, lower alkylamino, lower alkanoylamido, halogen, nitro, carboxy or carbo-lower alkoxy; and n is 1, 2 or 3.

and organic acids, such as hydrohalides (especially hydrochloride and hydrobromide), sulfate, nitrate, borate, phosphate, oxalate, tartrate, malate, citrate, acetate, ascorbate, sulccinate, benzensulfonate, methanesulfonate, cyclohexanesulfamate and toluenesulfonate. The acid addition salts frequently provide a convenient means for isolating the product, e.g., by forming and precipitating the salt in an appropriate menstruum in which the salt is insoluble, then after separation of the salt, neutralizing with a base such as barium hydroxide or sodium hydroxide, to obtain the free base of formula I. Other salts may then be formed from the free base by reaction with an equivalent of acid.

The new compounds of formula I are derived from arylsulfonylformamidoximes which are themselves new and form the subject matter of U.S. copending application Ser. No. 190,693 filed Oct. 19, 1971. The following flow scheme shows how the compounds of this invention may be produced.

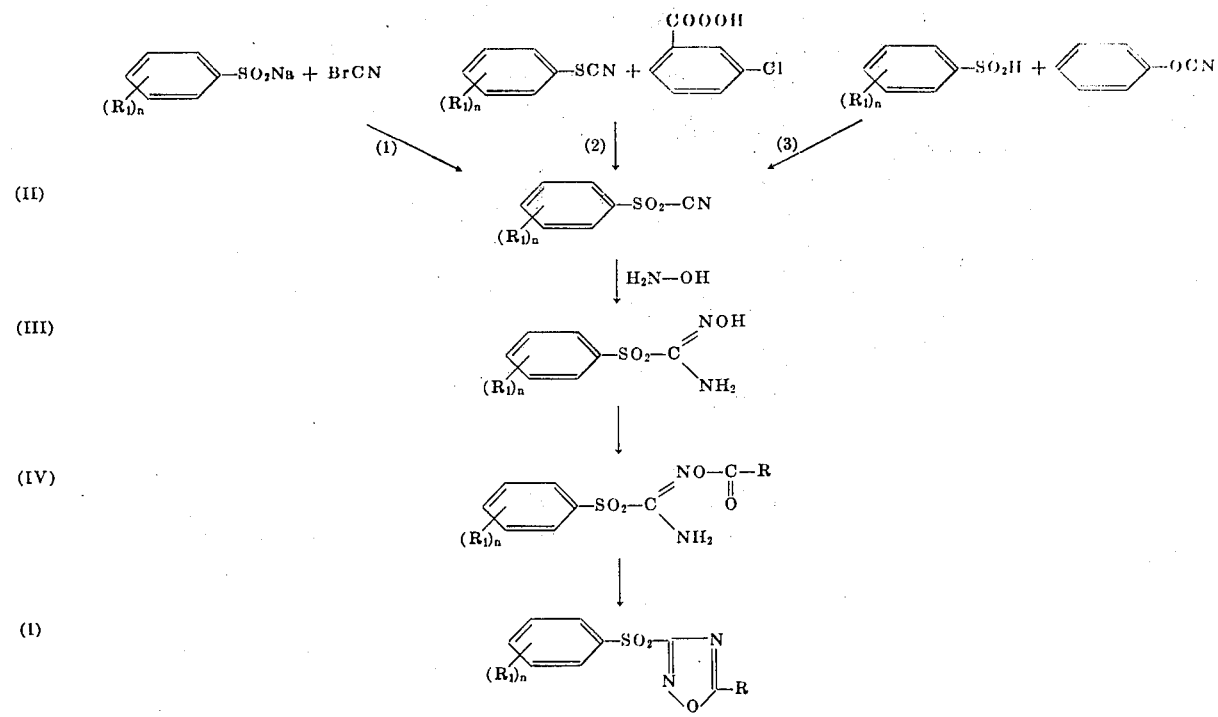

DETAILED DESCRIPTION OF THE INVENTION

In formula I, the lower alkyl groups represented by the symbols, as well as the lower alkoxy, lower alkylamino, lower alkylthio and carbo-lower alkoxy (COO-lower alkyl) group of which they are a part, are straight and branched chain aliphatic hydrocarbon radicals of up to eight carbon atoms such as methyl, ethyl, propyl, isopropyl, butyl, isobutyl, t-butyl, amyl and the like. The lower alkanoylamido groups contain the acyl radicals of the lower fatty acids, i.e., up to eight carbon atoms, including, for example, acetamido, propionamido, butyramido, isobutyramido and the like. The lowest two members in each instance are preferred. All four halogens are contemplated but chlorine and bromine are preferred. n is preferably 1. Especially preferred are those compounds wherein $R_1$ is hydrogen or lower alkanoylamido and R is trichloromethyl, amino, lower alkyl or guanidino.

Certain of the products of formula I form salts. The compounds of formula I wherein R or $R_1$ are basic groups, i.e., amino, lower alkylamino or guanidino form acid addition salts with the common inorganic The starting material of formula II may be obtained by any of several methods available in the literature as indicated in the above flow scheme.

See, for example, Cox et al., Tetrahedron Letters No. 39, 3351–3352 (1969); Pews, et al., Jour. Chem. Soc. (Sec. D, Chem. Commun.) 1969, 1187.

The compounds of formula III are produced by reacting a phenylsulfonyl cyanide of formula II with hydroxylamine or a salt thereof, e.g., a hydrohalide such as the hydrochloride. The reaction is effected in an inert organic solvent, e.g., an alcohol such as ethanol, at about room temperature in the presence of an alkali metal bicarbonate such as potassium bicarbonate. This produces the compound of formula III bearing the =NOH group.

For preparing compounds of formula I wherein R is other than hydrogen, the phenylsulfonylformamidoxime of formula III is treated with an acid anhydride, acide halide, or mixed acid ester halide to introduce the group

The phenylsulfonylformamidoxime of formula IV is then cyclized by heating. In the case where R is hydrogen, the oxime of Formula III is treated with formic acid. Preferably the phenylformamidoxime of formula III is treated with trichloroacetic anhydride to form a phenylsulfonylformamidoxime-O-trichloracetate (i.e., R is trichloromethyl). Heating of this compound in an inert organic hydrocarbon solvent such as toluene produces a 3-phenylsulfonyl-(1,2,4-oxadiazole) having the trichloromethyl group in the 5-position. The trichloromethyl group may then be readily replaced with other R groups by reaction with various substances such as ammonia, amines, mercaptans or the like in an inert organic solvent such as dioxane, dimethylformamide, methylene chloride or the like as illustrated below.

It will be appreciated that when R is $NH_2$, the heterocycle may tautomerize, and the tautomeric form is also within the scope of the invention.

The new compounds of Formula I are useful as antimicrobial agents and may be used to combat infections in animal species, such as mice, rats, dogs, guinea pigs and the like, due to organisms such as Trichomonas vaginalis, Trichomonas foetus, Staphylococcus aureus, Salmonella schottmuelleri, Klebsiella pneumoniae, Proteus vulgaris, Escherichia coli or Trichophyton mentagrophytes. For example, a compound or mixture of compounds of formula I or physiologically acceptable acid addition salt (when formed) thereof may be administered orally to an infected animal, e.g., to a mouse, in an amount of about 5 to 25 mg. per kg. per day in 2 to 4 divided doses. These may be conventionally formulated in a tablet, capsule or elixir containing about 10 to 250 mg. per dosage unit, by compounding the active substance or substances with the conventional excipient, vehicle, binder, preservative, flavor etc., as called for by accepted pharmaceutical practice. They may also be applied topically, e.g., to dermatophytosis in a guinea pig, in a lotion, salve or cream at a concentration of about 0.01 to 3 percent by weight.

They may also be used as surface disinfectants. About 0.01 to 1 percent by weight of any of these substances may be dispersed on an inert solid or in a liquid such as water and applied as a dust or spray. They may be incorporated also, for example, in a soap or other cleansing agent, e.g., a solid or liquid detergent, detergent composition, for example, in general cleaning, in cleaning dairy barns or equipment or cleaning food handling or processing equipment.

The compounds of this invention are also hypoglycemic agents which are effective in lowering blood sugar content in mammalian species such as mice, rats, rabbits, dogs or the like in a manner analogous to tolbutamide. Some are particularly noteworthy in their long duration of action. For this purpose a compound or mixture of compounds of formula I, or non-toxic, physiologically acceptable acid addition salt (when formed), may be administered orally or parenterally in a conventional dosage form as tablet, capsule, injectable or the like. A single dose, or preferably 2 to 4 divided daily doses, provided on a basis of about 1 to 50 mg. per kg. per day, preferably about 2 to 15 mg. per kg. per day, is appropriate. These may be conventionally formulated in an oral or parenteral dosage form by compounding about 10 to 250 mg. per unit of dosage with conventional vehicle, excipient, binder, preservative, stabilizer, flavor or the like as called for by accepted pharmaceutical practice.

The new compounds of this invention also have antiinflammatory properties and are useful as antiinflammatory agents, for example, to reduce local inflammatory conditions such as those of an edematous nature or resulting from proliferation of connective tissue in various mammalian species such as rats, dogs and the like when given orally in dosages of about 5 to 50 mg. per kg. per day, preferably 5 to 25 mg. per kg. per day, in single or 2 to 4 divided doses, as indicated by the carageenan edema assay in rats. The active substances may be utilized in compositions such as tablets, capsules, solutions or suspensions containing up to about 300 mg. per unit of dosage of a compound or mixture of compounds of formula I or physiologically acceptable acid addition salt thereof (when formed). They may be compounded in conventional manner with a physiologically acceptable vehicle or carrier, excipient, binder, preservative, stabilizer, flavor, etc. as called for by accepted pharmaceutical practice. Topical preparations containing about 0.01 to 3 percent by weight of active substance in a lotion, salve or cream may also be used.

The following examples are illustrative of the invention. All temperatures are expressed on the centigrade scale. Additional variations of the invention within the scope of formua I may be made according to the following procedures by suitable variations of the starting materials.

EXAMPLE 1

1-(Phenylsulfonyl)formamidoxime 0.76 g. (12 mmol.) of hydroxylamine hydrochloride are added to 1.6 g. (10 mmol.) of benzenesulfonyl cyanide in 15 ml. of absolute ethanol. The mixture is stirred at room temperature and 1.05 g. (12 mmole) of sodium bicarbonate are added in small portions. This is stirred for about two hours, the precipitate is filtered under suction and then washed thoroughly with water. The addition of water to the ethanolic filtrate yields additional product. The crude product is crystallized from n-butanol. 1 gm. of white crystalline 1-(phenylsulfonyl) formamidoxime is obtained, m.p. 108° (explosive).

EXAMPLE 2

1-(p-Chlorophenylsulfonyl)formamidoxime

White crystalline 1-(p-chlorophenylsulfonyl)formamidoxime, m.p. 73°–75° (dec.) is obtained by the procedure of Example 1 by substituting an equivalent amount of p-chlorophenylsulfonyl cyanide for the benzenesulfonyl cyanide.

EXAMPLE 3

1-(p-Toluenesulfonyl)formamidoxime

White crystalline 1-(p-toluenesulfonyl)formamidoxime, m.p. 80°–83° (dec.) is obtained by the procedure of Example 1 by substituting an equivalent amount of p-toluenesulfonyl cyanide for the benzenesulfonyl cyanide.

EXAMPLE 4

1-[(p-Acetamidophenyl)sulfonyl]formamidoxime

White crystalline 1-[(p-acetamidophenyl)sulfonyl]-formamidoxime, m.p. 150° (dec.) is obtained by the procedure of Example 1 by substituting an equivalent amount of (p-acetamidophenyl)sulfonyl cyanide for the benzenesulfonyl cyanide.

EXAMPLE 5

1-(Phenylsulfonyl)-O-(chloroacetyl)formamidoxime 2 g. (10 mmol.) of 1-(phenylsulfonyl)formamidoxime dissolved in 50 ml. of absolute tetrahydrofuran are treated with 1.9 g. (11 mmol.) of chloroacetic anhydride in 10 ml. of tetrahydrofuran. The temperature rises and a white precipitate of 1-(phenylsulfonyl)-O-(chloroacetyl) formamidoxime forms. After stirring for one half hour, the product is filtered under suction, washed with ether and then crystallized from methyl glycol in the form of white needles, m.p. 190° (dec.), yield 2.8 g.

EXAMPLE 6

1-(Phenylsulfonyl) formamidoxime-O-succinic acid monoester 2 g. (10 mmol.) of 1-(phenylsulfonyl)formamidoxime are dissolved in 50 ml. of dioxane and refluxed for 1 hour with 1.2 g. (12 mmol.) of succinic anhydride. The white product 1-(phenylsulfonyl)formamidoxime-O-succinic acid monoester crystallizes and is recrystallized in the form of white crystals from methyl glycol, m.p. 176°-178°.

EXAMPLE 7

1-(Phenylsulfonyl)formamidoxime-O-malonic acid methyl ester 5g. (25 mmol.) of 1-(phenylsulfonyl)formamidoxime are dissolved in 100 ml. of absolute dioxane, treated with 3.2 g. (40 mmol.) of pyridine and 5 g. (25 mmol.) of malonic acid methyl ester chloride are slowly added dropwise with stirring and cooling. The progress of the reaction is followed with thin layer chromatography. At the end of the reaction, the solvent is removed under vacuum and the residue is taken up with water, whereupon the product crystallizes. The product, 1-(phenylsulfonyl) formamidoxime-O-malonic acid methyl ester, is recrystallized from ethanol to obtain 2 g. of cream colored crystals, m.p. 156°-159° (dec.).

EXAMPLE 8

1-(Phenylsulfonyl)-O-(4-chlorobutyryl)formamidoxime 2.0 g. (10 mmol.) of 1-(phenylsulfonyl)formamidoxime and 0.8 g. (10 mmol.) of pyridine are dissolved in 50 ml. of tetrahydrofuran and 1.55 g. (11 mmol.) of 4-chlorobutyryl chloride are added slowly dropwise with stirring. After a short time, the product, 1-(phenylsulfonyl)-O-(4-chlorobutyryl)formamidoxime, crystallizes. It is recrystallized from methyl glycol to obtain 3 g. of white needles, m.p. 185° (dec.).

EXAMPLE 9

1-(Phenylsulfonyl)-O-(trichloroacetyl)formamidoxime 1-(Phenylsulfonyl)-O-(trichloroacetyl)formamidoxime, m.p. 160° (dec.) is obtained by the procedure of Example 5 by substituting an equivalent amount of trichloroacetic anhydride for the chloroacetic anhydride.

EXAMPLE 10

1-(Phenylsulfonyl)formamidoxime-O-carbanilate 2 g. (20 mmol.) of 1-(phenylsulfonyl) formamidoxime are dissolved in 25 ml. of toluene treated with 1.2 g. of phenylisocyanate and refluxed for one hour. 1.9 g. of a white crystalline 1-(phenylsulfonyl) formamidoxime-O-carbanilate are obtained as a precipitate which is recrystallized from methyl glycol-water, m.p. 193° (dec.).

EXAMPLE 11

3-(phenylsulfonyl)-5-(trichloromethyl)-1,2,4-oxadiazole 2 g. of 1-(phenylsulfonyl)-O-(trichloroactyl) formamidoxime are cyclized quantitatively by heating for a short time in toluene to obtain 3-(phenylsulfonyl)-5-(trichloromethyl)-1,2,4-oxadiazole, which is recrystallized from cyclohexane, white crystals, m.p. 93°-95°.

EXAMPLE 12

5-Amino-3-(phenylsulfonyl)-1,2,4-oxadiazole 10 g. of 3-(phenylsulfonyl)-5-(trichloromethyl)-1,2,4-oxadiazole are dissolved in dioxane saturated with ammonia gas and held at 50° for 16 hours in a glass autoclave. The mixture is concentrated to dryness, the residue is washed with ice-cold water and recrystallized from a little methanol. The product, 5-amino-3-(phenylsulfonyl)-1, 2,4-oxadizole, is obtained as white needles, m.p. 163°-165°; yield 4.1 g.

EXAMPLE 13

5-Amino-3-(p-tolylsulfonyl)-1,2,4-oxadiazole 3-(p-tolylsulfonyl)-5-trichloromethyl-1,2,4-oxadiazole is prepared by the procedure of Example 11 by substituting 1-(p-tolylsulfonyl)-O-(trichloroacetyl)-formamidoxime. The 1-(p-tolylsulfonyl)-O-(trichloroacetyl)formamidoxime is produced by the procedure of Example 1 by substituting p-toluenesulfonyl cyanide for the benzenesulfonyl cyanide.

20 g. of 3-(p-toluenesulfonyl)-5-(trichloromethyl)-1,2,4-oxadiazole in 100 ml. of methylene chloride-dioxane (1:1) and 20 ml. of liquid ammonia are kept in a glass autoclave for 20 hours at 50°. The product is worked up as in Example 2 and recrystallized from methyl glycol to obtain 9.8 g. of white crystalline 5-amino-3-(p-tolylsulfonyl)-1,2,4-oxadiazole, m.p. 206°-208°.

EXAMPLE 14

3-(p-Acetamidophenylsulfonyl)-5-trichloromethyl-1,2,4-oxadiazole 3.7 g. (15. mmol.) of 1-[(p-acetamidophenyl)sulfonyl]formamidoxime are dissolved in 50 ml. of dioxane-dimethylformamide and 4.6 g. (16 mmol.) of trichloroacetic anhydride are added dropwise at 15°. The mixture is then heated for five hours with stirring at 60°. After distilling off the solvent, there is obtained a light honey, viscous mass which upon the addition of water soon crystallizes. It is dried and recrystallized from toluene to obtain 2.8 g. of white crystalline 3-(p-acetamidophenylsulfonyl)-5-trichloromethyl-1,2,4-oxadiazole, m.p. 100°-103°.

EXAMPLE 15

3-(p-Acetamidophenylsulfonyl)-5-amino-1,2,4-oxadiazole

The product of Example 14 is treated according to the procedure of Example 13 and recrystallized from methanol to obtain light brown 3-(p-acetamidophenylsulfonyl)-5-amino-1,2,4-oxadiazole, m.p. 241°-243°.

EXAMPLE 16

3-[(p-Aminophenyl)sulfonyl]-5-trichloromethyl-1,2,4-oxadiazole 2.1g. of the product of Example 14 in 50 ml. of ethanol are heated at reflux fo one hour with 5 ml. of concentrated hydrochloric acid. 0.7 g. of white product precipitates. The product, 3-[(p-aminophenyl)sulfonyl]-5-trichloromethyl-1,2,4-oxadiazole, is recrystallized from ethanol, m.p. 165° (dec.).

EXAMPLE 17

5-Amino-3-[(p-aminophenyl)sulfonyl]-1,2,4-oxadiazole

The product of Example 16 is treated with ammonia in an autoclave as in Example 13. The yellow crystalline product, 5-amino-3-[(p-aminophenyl)sulfonyl]-1,2,4-oxadiazole, is recrystallized from isopropanol, m.p. 195° (dec.).

EXAMPLE 18

3-[(p-Acetamidophenyl)sulfonyl]-5-guanidino-1,2,4-oxadiazole 1.9 g. (5 mmol.) of 3-(p-acetamidophenylsulfonyl)-5-trichloromethyl-1,2,4-oxadiazole are added at 50° to a solution of 0.5 g. (5.5 mmol.) of guanidine hydrochloride and 0.16 g. (5.5 mmol.) of sodium in 20 ml. of ethanol and the mixture is stirred for 24 hours. The precipitate is washed with water and recrystallized from methyl glycol-water to obtain 0.5 gm. of white crystalline 3-[(p-acetaminophenyl)sulfonyl]-5-guanidino-1,2,4-oxadiazole, m.p. 268°–269°.

The following additional compounds are prepared by substituting for the benzenesulfonyl cyanide in the procedure of Example 1 the appropriately substituted analog when $R_1$ is other than hydrogen, then following the procedures of Examples 9 and 11 and where applicable, finally substituting for the ammonia in the procedure of Example 12 or the guanidine in the procedure of Example 18 to obtain the desired R substituent.

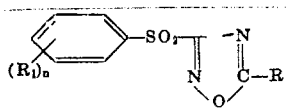

| Example | R | $R_1$ | n |
|---|---|---|---|
| 19 | NH-CH$_3$ | p-NH$_2$ | 1 |
| 20 | OH | p-NH$_2$ | 1 |
| 21 | S-CH$_3$ | p-NH$_2$ | 1 |
| 22 | NH$_2$ | p-Cl | 1 |
| 23 | NH$_2$ | p-Br | 1 |
| 24 | NH$_2$ | p-COOC$_2$H$_5$ | 1 |
| 25 | NH$_2$ | p-NO$_2$ | 1 |
| 26 | H | H | 1 |
| 27 | SCH$_3$ | p-CH$_3$ | 1 |
| 28 | CCl$_3$ | p-NO$_2$, o-Cl | 2 |
| 29 | NHC$_2$H$_5$ | H | 1 |
| 30 | OC$_2$H$_5$ | H | 1 |
| 31 | H | p-COOH | 1 |
| 32 | NH$_2$ | p-NHC$_2$H$_5$ | 1 |
| 33 | NH$_2$ | p-NHCH$_3$ | 1 |
| 34 | NH$_2$ | 3,4,5-(CH$_3$)$_3$ | 3 |
| 35 | H | 3,5-(Br)$_2$ | 2 |

What is claimed is:

1. A compound of the formula

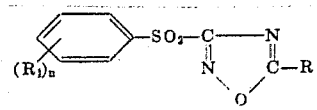

wherein

R is hydrogen, trichloromethyl, amino, lower alkylamino, guanidino, hydroxy, lower alkoxy or lower alkylthio;

$R_1$ is hydrogen, lower alkyl, amino, lower alkylamino, lower alkanoylamido, halogen, nitro, carboxy or carbo-lower alkoxy, and n is 1, 2 or 3, and acid addition salts thereof.

2. A compound as in claim 1 wherein $R_1$ is hydrogen.

3. A compound as in claim 1 wherein R is trichloromethyl.

4. A compound as in claim 1 wherein R is trichloromethyl and $R_1$ is hydrogen.

5. A compound as in claim 1 wherein R is trichloromethyl, $R_1$ is amino and n is 1.

6. A compound as in claim 1 wherein R is amino, $R_1$ is lower alkyl and n is 1.

7. A compound as in claim 6 wherein the lower alkyl group is methyl.

8. A compound as in claim 1 wherein R is amino, $R_1$ is lower alkanoylamido and n is 1.

9. A compound as in claim 8 wherein the lower alkanoylamido group is acetamido.

10. A compound as in claim 1 wherein R is guanidino, $R_1$ is lower alkanoylamido and n is 1.

11. A compound as in claim 10 wherein the lower alkanoylamido group is acetamido.

* * * * *